UNITED STATES PATENT OFFICE.

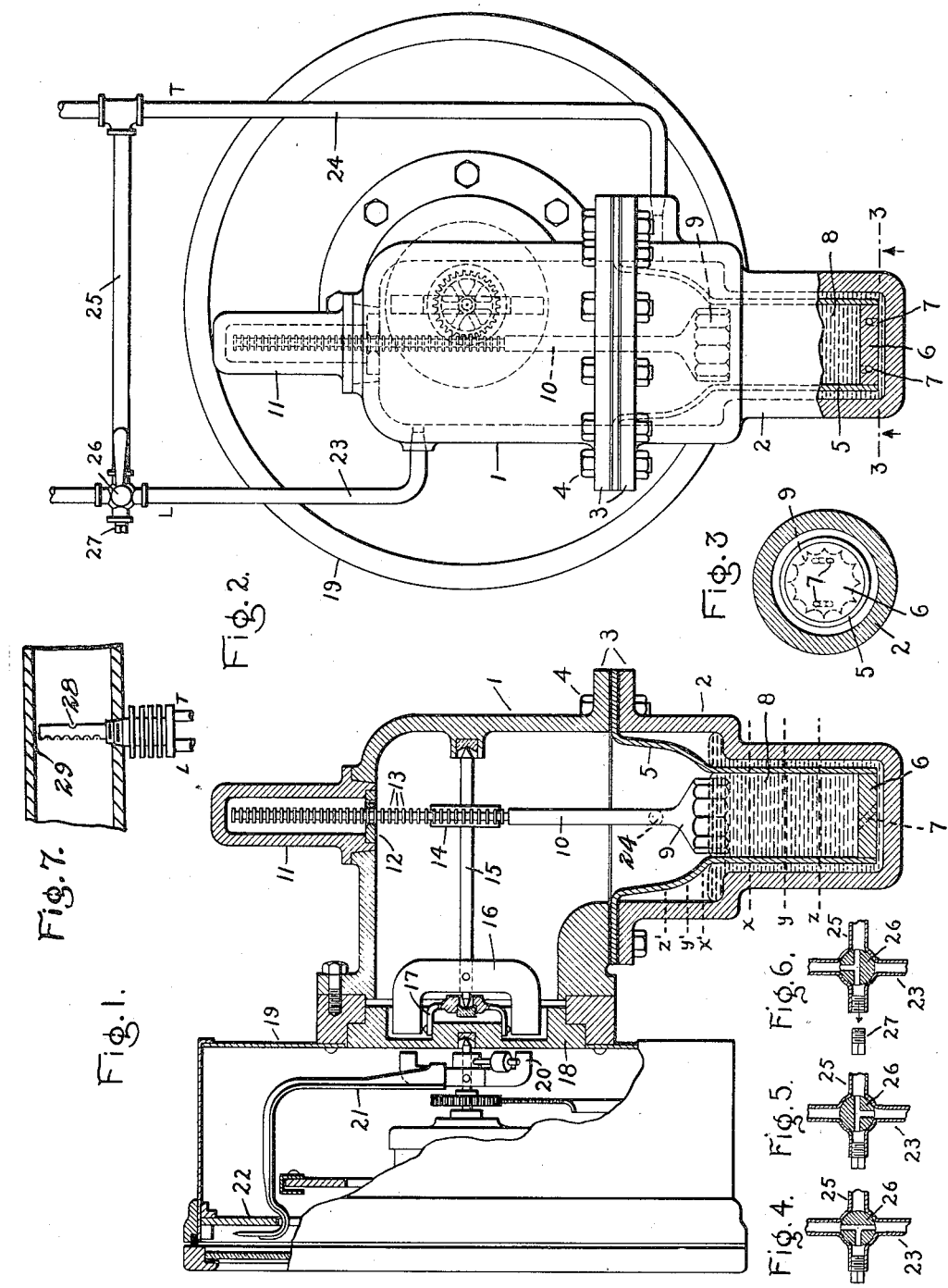

JAMES WILKINSON, OF SCHENECTADY, NEW YORK, ASSIGNOR TO GENERAL ELECTRIC COMPANY, A CORPORATION OF NEW YORK.

INDICATING-METER FOR FLUIDS.

1,147,995.   Specification of Letters Patent.   Patented July 27, 1915.

Application filed June 21, 1913. Serial No. 775,031.

*To all whom it may concern:*

Be it known that I, JAMES WILKINSON, a citizen of the United States, residing at Schenectady, in the county of Schenectady, State of New York, have invented certain new and useful Improvements in Indicating-Meters for Fluids, of which the following is a specification.

This invention relates to instruments for indicating the flow of steam or other fluid through a conduit. The meter is designed to show the rate of flow at any instant of time. Such instruments usually comprise means for converting the velocity head of the fluid into a pressure head, and a pressure-responsive device, or meter proper, to measure and display visible indications of the changes in pressure due to varying flow of the fluid.

The present invention has to do with the indicator or meter, and it consists in certain improvements in that type of meter shown in my pending application filed Nov. 4, 1912, Serial Number 729,454, wherein what is substantially a U-shaped tube containing a mass of mercury has its two legs connected respectively with the high and low (leading and trailing) pressure regions of the aforesaid device for converting the velocity head into pressure. This device may be of any known or desired form. In the meter proper, a float rests upon the column of mercury in one leg of the instrument, and the rise and fall of the float communicates rotation to a shaft carrying one-half of a magnetic clutch, whose other half is located outside of the pressure chamber and actuates suitable indicating and recording devices.

In the present invention, the float is located in the leading pressure chamber, and the trailing pressure chamber has a peculiar configuration designed to give equal increments of travel to the float for equal increments of volume of fluid flow. This enables me to dispense with the special planimeter commonly utilized and to avoid the use of non-uniform dials. The float is connected to the shaft carrying the driving part of the clutch by a rack and pinion, and in order to keep the rack clean, it is cylindrical in shape and provision is made for rotating it. The rotation of the rack is accomplished by attaching it to the float and rotating the float automatically by the rise and fall of the mercury. This serves also to keep the float clean, and enables it to start more easily when the mercury rises or falls. The float is located in the leading pressure chamber, so that there is no danger of damaging the working parts by an over-deflection of mercury due to an excessive rate of flow in the conduit being metered, the float being arranged so that it will act as a valve and close the mercury passages 7 when completely deflected. Sufficient chamber capacity is provided on both leading and trailing sides to contain all the mercury in case over pressure and accidental leakage causes extreme over-deflection; so that the water in the pipes will pass by the mercury and will not carry it out of the instrument. A three-way cock in the leading pipe and a by-pass connecting this pipe with the trailing pipe enable the meter to be cut out of service, and also provide for blowing out the pipes when desired.

In the accompanying drawing, Figure 1 is a sectional side elevation of a meter embodying my invention. Fig. 2 is a rear elevation, with the lower end in section. Fig. 3 is a cross-section on line 3—3, Fig. 2. Figs. 4, 5 and 6 are cross-sections of the three-way cock in its different positions. Fig. 7 shows a typical pressure difference device.

The casing of the meter comprises upper and lower sections 1 and 2 secured together on a horizontal plane by flanges 3 and bolts 4. Clamped between the flanges is the flanged upper end of a sheet steel tube 5 which depends into the lower section 2 nearly to its bottom, and divides it into an inner leg and an outer annular leg. The lower portion of the tube is cylindrical, concentric with the inclosing portion of the casing section 2, which is preferably but little larger in diameter. The lower end of the tube is closed by a plate 6 in which at opposite points are two oblique holes or nozzles 7, for a purpose hereinafter described.

The upper portion of the casing section 2 is larger in diameter than the lower portion, and that part of the tube 5 inside this portion widens out so that the walls of the annular chamber between said casing and tube converge and the cross-section of the chamber diminishes toward the top. The tube is of thin stock, so that it can be pressed or spun into shape. A mass of mercury 8 fills the lower portion of the casing section 2 up to just about the level of the lower end of the enlarged portion of said section, as clearly shown in Fig. 1. Resting on the mercury in the inner leg is a float 9, preferably a cylindrical disk having a toothed or scalloped edge and fitting quite loosely in the cylindrical portion of the tube 5. From the float a stem 10 rises through the upper section 1 of the casing, extending into a dome or hood 11 which closes an opening in the top of said section. A washer 12 or equivalent device, at the lower end of said hood, serves as a guide for the stem.

The upper portion of the stem is provided with teeth 13 to form a rack, and these are preferably in the shape of collars surrounding the cylindrical stem so that the rack is capable of rotation. It meshes with a pinion 14 on a horizontal spindle 15 extending across the section 1 of the casing and carrying at its front end one-half of a magnetic clutch, preferably a U-shaped permanent magnet 16. The journal bearing for the front end of the spindle is carried in a yoke 17 secured to the inside of a non-magnetic cap 18 which closes the open front end of the section 1 of the casing. All the joints of the casing are of course fluid-tight.

Supported by the cap 18 is a sheet metal casing 19 in which is journaled an arbor carrying the other half of the clutch, such as the U-shaped magnet 20, whose poles are alined with those of the magnet 16. Between these magnets the cap 18 is preferably made thin to permit a ready passage of the magnetic flux. Secured to the magnet 20 is a needle 21 which coöperates with a suitable dial 22. Recording mechanism, may also be operated by the magnet 20, if desired, as shown in my aforesaid application.

The pipe 23 from the region of high pressure in the pressure-difference device 28 in the conduit 29 is connected with the upper section 1 of the casing, so that such pressure can act upon the mercury in the inner leg. The pipe 24 from the region of low or trailing pressure is connected to the annular chamber above the mercury in the annular outer leg and located between the casing section 2 and the parabolically curved portion of the tube 5. A by-pass 25 connects the pipes 23, 24 at some convenient point. At the intersection of the pipe 23 and the bypass, a three-way cock 26 is introduced, having a blow-off opening closed by a removable plug 27. This cock normally occupies the position shown in Fig. 4, allowing the high pressure to pass freely to the meter, and at the same time closing the by-pass 25. A quarter turn, to the position shown in Fig. 5, shuts off the high pressure and opens the by-pass so as to permit the mercury to assume its zero position; while a turn to the opposite position, and the removal of the plug 27, enables the two pipes to be blown out without affecting the meter.

Any fluctuation in the relative pressures in the leading and trailing legs of the meter causes the mercury to rise in one leg and fall in the other. The mercury flows from one leg to the other through the oblique holes or nozzles 7 and in doing so it sets up a whirling motion of the mercury in the inner leg. This motion imparts a slow rotary movement to the float and its stem, which serves three purposes. First, it keeps the circular rack clean by wiping it on the teeth of the pinion. Secondly, it assists in starting the float from a position of rest. Thirdly, it throws off any mercury that has lodged on top of the float. For small changes in flow the float and stem may only move a portion of a complete turn.

As the mercury rises and falls in the trailing chamber, the progressively restricted cross-section of said chamber compels it to rise an increasing distance for each additional increment of fall of the float. Now the pressure difference device is responsive to changes in velocity of fluid flow. The pressure does not vary directly with the velocity, but as its square. That is to say, the pressure will be quadrupled when the velocity is doubled. In other words, if the scale is graduated uniformly, and a velocity $a$ produces a pressure which moves the index from zero to 1, then when the velocity becomes $2^a$, the index will move to 4; with a velocity of $3^a$ the index will move to 9, and so on. The volume of flow, however, varies directly with the velocity. Consequently, if the readings are to be made in volume, the scale must be graduated un-uniformly, if the float moves through equal distances for equal increments of pressure. To be able, therefore, to graduate the scale uniformly for volume and still have the float move through constant increments of space, the resistance of the column of mercury to the leading pressure must be constantly increased in the aforesaid ratio of pressure to velocity. Consequently, I am able, by giving the wall of the trailing chamber a proper curvature, to compel the mercury to rise therein at an increasing rate, and thus produce a counterbalancing weight, against which the leading pressure must act, which increases at the rate necessary to enable the float to move through equal spaces for equal increments of volume of flow. Thus in Fig. 1 if a given velocity will cause the float to drop from zero to the dotted line $x$ and the mercury in the trailing chamber to rise to the level $x'$, then in order to let the float descend another similar distance to $y$, the mercury must be lifted to the level $y'$ or four times as far; or in other words the leading pressure must be quadrupled. For a third drop of the float through the same distance to $z$, the mercury must be forced up to $z'$, or nine times its first movement; that is, the leading pressure must rise to nine times that which lifted the mercury to $x'$. The rack and pinion move the index through equal angular distances on the dial, for equal increments of travel of the float, so that the dial can be uniformly graduated for volumetric readings.

The single guide washer 12 simplifies the design and eliminates the friction that a second guide would cause. It makes it easy to adjust the mesh of the rack and pinion. The rack is guided at the bottom by the mercury around the float. This gives a slight freedom at the point of tooth contact that enables the engagement to accommodate itself to slight errors in adjustment, or obstructions that would otherwise cause excessive friction and possible error if the mounting were rigid.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A fluid flow meter comprising a casing, means providing two communicating chambers therein, one having parallel walls and the other walls whose upper portions converge, a mass of mercury in said chambers, a float in the first named chamber, indicating devices actuated by said float, and conduits adapted for connecting said chambers respectively with the high and low pressure regions of a pressure-difference device.

2. A fluid flow meter comprising a casing, a tube dividing a portion of said casing into concentric chambers, one wall of the outer chamber having its upper portion curved toward the casing, a mass of mercury in said chambers, and conduits adapted for connecting the inner and outer chambers respectively to the high and low pressure regions of a pressure-difference device.

3. A fluid flow meter having a casing comprising a lower cylindrical section, a tube in said section dividing it into concentric chambers, the upper portion of the outer chamber having a diminishing cross-section toward the top, a mass of mercury in said section of the casing, and pipes for conveying to the inner and outer chambers respectively the leading and trailing pressures of a pressure-difference device.

4. A fluid flow meter having a casing comprising upper and lower sections, a tube depending into the lower section and having a flange clamped between said sections, the upper portion of said tube having a curvature toward said casing, a mass of mercury in said lower section, a float resting on the mercury in the tube, and connections for admitting leading and trailing pressures from a pressure-difference device to opposite sides of said tube.

5. A fluid flow meter comprising a casing containing a mass of mercury, conduits adapted for connection to a pressure-difference device to cause the mercury to change its level, a float resting on said mercury, and means for automatically imparting a whirling motion to said mercury in order to rotate said float on its vertical axis.

6. A fluid flow meter comprising a casing, a tube in said casing having a plate at its lower end containing an oblique opening, a mass of mercury in said casing and tube, conduits adapted for connection to a pressure difference device to cause the mercury to change its level, thereby causing it to pass through said opening and be given a whirling motion, and a float resting on said mercury and capable of rotation thereby.

7. A fluid flow meter comprising a casing containing a mass of mercury, conduits adapted for connection to a pressure-difference device, a float rising and falling with said mercury, a stem on said float provided with collars forming a cylindrical rack, a pinion meshing with said rack, and means for rotating said float and rack.

8. A fluid flow meter comprising a casing, a cylindrical tube therein, a float adapted to rise and fall freely in said tube, a stem on said float, a cylindrical rack on said stem, a pinion meshing with said rack, and a washer for guiding said stem above said pinion.

9. The combination with a fluid flow meter having pipes adapted for connection with the high and low pressure regions of a pressure-difference device, of a bypass connecting said pipes, and a three-way cock at the junction of said bypass with the high pressure pipe.

10. The combination with a fluid flow meter having pipes adapted for connection with the high and low pressure regions of a pressure difference device, of a bypass connecting said pipes, a blow-off opening, and a three-way cock controlling the high-pressure pipe, the bypass and the blow-off.

11. In a fluid flow meter, a casing having a lower cylindrical section having an enlarged upper portion, and a sheet metal tube arranged concentrically within said section, the upper portion of said tube within the enlarged upper portion of said section being enlarged on a curve which diminishes toward the top of the cross-section of the space between said tube and casing.

12. In a flow meter, the combination of a casing having walls which define the two legs of a U-tube, a mass of liquid therein, conduits communicating with the respective legs of the U-tube and adapted for connection to a pressure difference creating device to cause the liquid to change its level, a float which rides on said liquid, and means arranged between the two legs of the U-tube for imparting a whirling motion to the liquid when the liquid is caused to change its level.

13. In a flow meter, the combination of a casing having walls which define the two legs of a U-tube, a mass of liquid therein, conduits communicating with the respective legs of the U-tube and adapted for connection to a pressure difference creating device to cause the liquid to change its level, a float which rides on said liquid, and means arranged in the U-tube for causing the liquid to impart a rotary motion to the float when the liquid changes its level.

14. In a flow meter, the combination of a casing having walls which define the two legs of a U-tube, a mass of liquid therein, conduits communicating with the respective legs of the U-tube and adapted for connection to a pressure difference creating device to cause the liquid to change its level, a float which rides on said liquid, a stem on said float having a cylindrical rack, a pinion meshing with said rack, and means controlled by changes in the level of the liquid for rotating said float on its vertical axis.

In witness whereof, I have hereunto set my hand this 20th day of June 1913.

JAMES WILKINSON.

Witnesses:
BENJAMIN B. HULL,
HELEN ORFORD.

Copies of this patent may be obtained for five cents each, by addressing the "Commissioner of Patents, Washington, D. C."